United States Patent [19]

Keogh

[11] 4,440,907
[45] Apr. 3, 1984

[54] PROCESS OF PRODUCING A WATER-CURABLE, SILANE MODIFIED ALKYLENE-ALKYL ACRYLATE COPOLYMER BY REACTING AN ALKYLENE-ALKYL ACRYLATE COPOLYMER WITH A POLYSILOXANE PREDISPERSED IN A THERMOPLASTIC RESIN MATRIX

[75] Inventor: Michael J. Keogh, Bridgewater, N.J.

[73] Assignee: Union Carbide Corporation, Danbury, Conn.

[21] Appl. No.: 419,142

[22] Filed: Sep. 17, 1982

Related U.S. Application Data

[60] Division of Ser. No. 294,784, Aug. 20, 1981, Pat. No. 4,369,289, which is a continuation-in-part of Ser. No. 192,319, Sep. 30, 1980, Pat. No. 4,328,323, which is a continuation-in-part of Ser. No. 70,785, Aug. 19, 1978, Pat. No. 4,291,136, which is a continuation-in-part of Ser. No. 892,153, Mar. 31, 1978, abandoned.

[51] Int. Cl.$^3$ .................... C08L 23/26; C08L 83/10
[52] U.S. Cl. ............................ 525/106; 525/69; 525/475
[58] Field of Search ................ 525/106, 475, 69

[56] References Cited

U.S. PATENT DOCUMENTS

| | | | |
|---|---|---|---|
| 3,398,045 | 8/1968 | Clayton et al. | 525/106 |
| 4,291,136 | 9/1982 | Keogh | 525/102 |
| 4,328,323 | 5/1982 | Keogh | 525/106 |
| 4,349,605 | 9/1982 | Biggs et al. | 525/106 |

*Primary Examiner*—Wilbert J. Briggs, Sr.
*Attorney, Agent, or Firm*—James C. Arvantes; Robert C. Brown

[57] ABSTRACT

Relatively stable masterbatch compositions are provided comprising a matrix having a polysiloxane dispersed therein, prepared by admixing a solid or liquid matrix, a monomeric silane and a silane condensation catalyst with the result that the monomeric silane condenses to a polysiloxane which is dispersed throughout the matrix per se or as a reactant therein. The masterbatch composition can be admixed with alkylene-alkyl acrylate copolymers in the presence of an organic titanate, to produce water-curable compositions, containing water-curable, silane modified alkylene-alkyl acrylate copolymers, which are useful as extrudates about wires and cables providing protective coatings thereon.

19 Claims, No Drawings

PROCESS OF PRODUCING A WATER-CURABLE, SILANE MODIFIED ALKYLENE-ALKYL ACRYLATE COPOLYMER BY REACTING AN ALKYLENE-ALKYL ACRYLATE COPOLYMER WITH A POLYSILOXANE PREDISPERSED IN A THERMOPLASTIC RESIN MATRIX

This application is a division of our prior U.S. application Ser. No. 294,784 filed Aug. 20, 1981, now U.S. Pat. No. 4,369,289, which is a continuation-in-part of application Ser. No. 192,319 filed Sept. 30, 1980, now U.S. Pat. No. 4,328,323 which is a continuation-in-part of application Ser. No. 70,785, filed Aug. 19, 1978 now U.S. Pat. No. 4,291,136 which is a continuation in part of Ser. No. 892,153 filed Nov. 31, 1978 now abandoned.

SUMMARY OF THE INVENTION

This invention relates to a relatively moisture stable, masterbatch composition comprising a matrix having a polysiloxane dispersed therein and to a method for the preparation thereof by admixing a monomeric silane and a silane condensation catalyst in a matrix with the result that the monomeric silane condenses to a polysiloxane which is dispersed throughout the matrix. The resultant composition can be admixed with alkylene-alkyl acrylate copolymers, in the presence of an organic titanate, to produce water-curable compositions, containing water-curable, silane modified alkylene-alkyl acrylate copolymers, which are useful as extrudates about wires and cables providing protective coatings thereon, such as insulation and jacketing.

BACKGROUND OF THE INVENTION

Silane modified alkylene-alkyl acrylate copolymers are particularly desirable for use in commercial applications as these polymers and compositions based thereon can be cured by a simple water treatment, as opposed to the more conventional peroxide curing, to crosslinked products of high crosslinked density. As a result, silane modified alkylene-alkyl acrylate copolymers and compositions based on these polymers are especially useful in extrusion applications, being capable of extrusion under a wide latitude of processing conditions, as for example, temperatures far in excess of maximum processing temperatures used in extruding peroxide containing compositions.

The production of silane modified alkylene-alkyl acrylate copolymers is carried out, conveniently, by admixing a polysiloxane with an alkylene-alkyl acrylate copolymer, in the presence of an organo titanate, as described in detail in my copending application Ser. No. 192,319 filed Sept. 30, 1980, now U.S. Pat. No. 4,328,323 the disclosure of which is incorporated herein by reference, with the result that the polysiloxane reacts with the alkylene-alkyl acrylate copolymer yielding a water-curable, silane modified alkylene-alkyl acrylate copolymer.

In carrying out this reaction, care must be taken to protect the polysiloxane from moisture. Polysiloxanes hydrolyze rapidly, on contact with moisture, and condense to gelled products which, for all practical purposes, are useless. In addition to the problem of moisture sensitivity, it is difficult, in some instances, to blend the polysiloxanealkylene-alkyl acrylate reaction mixtures, particularly when the reaction mixtures are highly filled with additives. Consequently, additional time and/or processing steps may be required in order to homogenize the reaction mixtures, which is necessary in order to effect substantially complete reaction between the polysiloxane and the alkylene-alkyl acrylate copolymer.

DETAILED DESCRIPTION OF THE INVENTION

The present invention provides moisture resistant, masterbatch compositions comprising a matrix having dispersed therein a polysiloxane, produced by admixing a monomeric silane and a silane condensation catalyst in a matrix with the result that the monomeric silane condenses to a polysiloxane which is dispersed throughout the matrix. The resultant masterbatch composition is resistant to moisture and can be used to produce water-curable, silane modified alkylene-alkyl acrylate copolymers by admixing the desired amount of masterbatch, containing a known amount of polysiloxane, with an alkylene-alkyl acrylate copolymer in the presence of an organo titanate.

The moisture resistant masterbatch compositions of this invention comprise a matrix having dispersed therein a polysiloxane, per se or reacted with the matrix. A particularly desirable masterbatch composition is one containing a polysiloxane having an organo titanate combined therewith.

Illustrative of materials which can be used as matrices are the thermoplastic resins such as ethylene polymers including ethylene homopolymers and copolymers. The ethylene copolymers contain at least about 10 percent by weight ethylene and up to about 90 percent by weight of propylene and/or up to about 70 percent by weight of other organic compounds which are polymerizable with ethylene. Exemplary of such compounds are butene-1, pentene-1, isoprene, butadiene, bicycloheptadiene, bicycloheptene, styrene and the like as well as alkyl acrylates, subsequently defined, exemplified by ethyl acrylate and also vinyl compounds such as vinyl acetate and the like.

Other suitable thermoplastic resins include chlorinated resins such as chlorinated polyethylenes, chloro waxes, styrene-butadiene rubbers, styrene-isoprene rubbers, nitrilebutadiene rubbers, silicon rubbers and oils, natural rubber, chlorosulfonated polyethylene, polypropylenes, ethylene-propylene-diene terpolymers, polychloroprene and the like. Other suitable matrix materials are paraffin oils, ester plasticizers such as dioctylphthalate, nonylphthalate and the like.

In general, any solid or liquid or mixtures thereof which have a degree of compatibility with the polysiloxane and the alkylene-alkyl acrylate copolymer and do not adversely interfere with the reaction between the polysiloxane and the alkylene-alkyl acrylate copolymer can be used as matrices in accordance with the present invention.

Polysiloxanes, which can be admixed directly with matrices or formed in situ as described subsequently, contain repeating units of the formula:

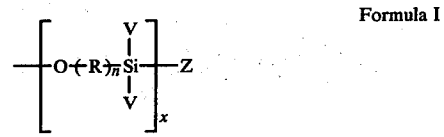

Formula I wherein R is a divalent hydrocarbon radical having a maximum of 18 carbon atoms; each V, which can be the same or different, is hydrogen, a monovalent hydrocarbon radical having a maximum of 18 carbon atoms, or a hydrolyzable group; Z is a hydrolyzable group; n is an integer having a value of one to 18 inclusive and x is an integer having a value of at least 2, generally 2 to 1000, preferably 5 to 25 inclusive.

Illustrative of suitable hydrocarbon radicals for R are alkylene radicals having one to 18 carbon atoms inclusive, preferably one to 6 carbon atoms inclusive, such as methylene, ethylene, propylene, butylene, hexylene and the like; alkoxy radicals having one to 18 carbon atoms inclusive, preferably one to 6 carbon atoms inclusive such as methyloxymethyl, methyloxyethyl, methyloxypropyl, ethyloxymethyl, ethyloxyethyl, ethyloxypropyl, propyloxypropyl, propyloxybutyl, propyloxyhexyl and the like.

As stated, each V can be hydrogen, a hydrocarbon radical or a hydrolyzable group. Illustrative of suitable hydrocarbon radicals are alkyl radicals having one to 18 carbon atoms inclusive, preferably one to 6 carbon atoms inclusive such as methyl, ethyl, n-propyl, isopropyl, n-butyl, n-hexyl and the like; alkoxy radicals having one to 18 carbon atoms inclusive, preferably one to 8 carbon atoms inclusive, such as methoxy, ethoxy, propoxy, hexoxy, dodecyloxy, methoxyethoxy and the like; aryl radicals having 6 to 8 carbon atoms inclusive such as phenyl, methylphenyl, ethylphenyl and the like; cycloaliphatic radicals having 5 to 8 carbon atoms inclusive such as cyclopentyl, cyclohexyl, cyclohexyloxy and the like.

Z, as previously stated, is a hydrolyzable group among which can be noted alkoxy radicals are previously described for R; oxyaryl radicals such as oxyphenyl and the like; oxyaliphatic radicals such as oxyhexyl and the like; halogens such as chlorine and the like and other hydrolyzable groups as further described in U.S. Pat. No. 3,408,420 to John B. Wiggill patented Oct. 29, 1968.

Polysiloxanes having repeating units falling within the scope of Formula I can be prepared as described in U.S. Pat. No. 3,139,567 to Gerd Rossmy patented July 6, 1965 or by condensing a silane falling within the scope of Formula II in the presence of a catalyst such as an organo titanate or a metal carboxylate.

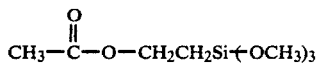

Formula II wherein $R^1$ is a monovalent hydrocarbon radical having a maximum of 18 carbon atoms as for example as alkyl radical having one to 18 carbon atoms inclusive, preferably one to four carbon atoms inclusive such as methyl, ethyl, n-propyl, isopropyl, n-butyl and the like; alkylene radicals having two to 18 carbon atoms inclusive, preferably two to 4 carbon atoms inclusive such as ethylene, propylene, isopropenyl and the like; aryl radicals having six to ten carbon atoms inclusive such as phenyl, benzyl and the like. Other variables are as previously defined.

Exemplary of suitable silanes falling within the scope of Formula II are the following:

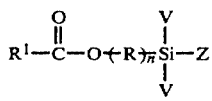

acetooxyethyltrimethoxysilane

acetooxyethyltriethoxysilane

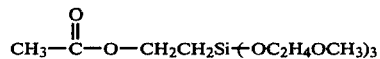

acetooxyethyl-tris-(2-methoxyethoxy)silane

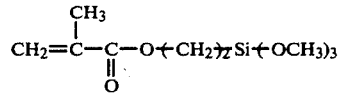

β-methacryloxyethyltrimethoxysilane

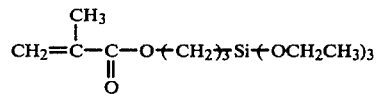

γ-methacryloxypropyltriethoxysilane

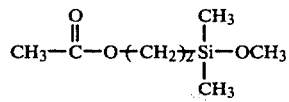

acetooxyethyldimethylmethoxysilane

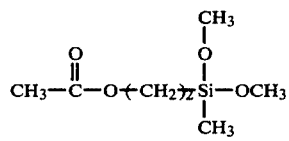

acetooxyethylmethyldimethoxysilane

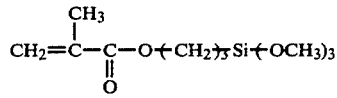

γ-methacryloxypropyltrimethoxysilane

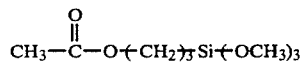

acetooxypropyltrimethoxysilane

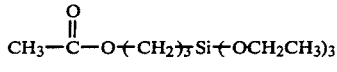

acetooxypropyltriethoxysilane

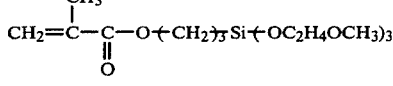

γ-methacryloxypropyl-tris-(2-methoxyethoxy)silane

Among catalysts, suitable for condensing monomeric silanes to polysiloxanes, can be mentioned metal carboxylates such as dibutyltin dilaurate, stannous acetate, stannous octoate, lead naphthenate, zinc octoate, iron 2-ethyl hexoate and the like. Conditions employed for the production of polysiloxanes, reaction temperatures, amount of materials and the like, using metal carboxylates as catalysts are the same as subsequently described with respect to the use of organo titanates, which can also be used to condense monomeric silanes to polysiloxanes.

Illustrative of suitable organo titanates fall within the scope of Formula III:

$$Ti(OR^2)_4 \qquad \text{Formula III}$$

wherein each $R^2$, which can be the same or different, is hydrogen or a monovalent hydrocarbon radical having one to 18 carbon atoms inclusive, preferably one to 14 carbon atoms inclusive, provided that at least one $R^2$ is a hydrocarbon radical.

Exemplary of suitable hydrocarbon radicals for $R^2$ are alkyl radicals such as methyl, ethyl, n-propyl, isopropyl, butyl, octyl, lauryl, myristyl, stearyl and the like; cycloaliphatic radicals such as cyclopentyl, cyclohexyl and the like; aryl radicals such as phenyl, methylphenyl, chlorophenyl and the like; alkaryl radicals such as benzyl and the like.

Particularly desirable titanates falling within the scope of Formula III are those wherein each $R^2$ is alkyl having one to 18 carbon atoms inclusive, preferably one to 14 carbon atoms inclusive, exemplified by tetrabutyl titanate, tetraisopropyl titanate and the like.

Organo titanates falling within the scope of Formula III are known compounds and can be conveniently prepared as described in U.S. Pat. No. 2,984,641 to Leon E. Wolinsky patented May 16, 1961.

Other suitable organo titanates are the organo titanium chelates such as tetraoctylene glycol titanium, triethanol amine titanate, titanium acetyl acetonate, titanium lactate and the like.

At least a catalytic amount of organo titanate is used to produce the polysiloxanes, that is, an amount sufficient to catalyze the condensation of monomeric silanes to polysiloxanes. As a rule, the amount of organo titanate used is on the order of about 0.001 to about 25 percent by weight based on the weight of the monomeric silane. It is preferred to use about 0.5 to about 5 percent by weight of organo titanate based on the weight of the monomeric silane.

The temperature at which the reaction is conducted can be varied over a wide range, for example from about 0° C. to about 250° C. A temperature in the range of about 70° C. to about 130° C. is preferred. Also, the reaction can be conducted using a suitable solvent, illustrated by hydrocarbon solvents such as toluene, xylene, cumene, decalin, dodecane, chlorobenzene and the like.

The condensation of a monomeric silane in the presence of a catalyst can be conducted under atmospheric, subatmospheric or superatmospheric pressure. It is preferred to conduct the later stages of the reaction under subatmospheric pressure to allow for more facile removal of volatile by-products. Also, the reaction is preferably conducted under the atmosphere of an inert gas such as nitrogen or argon to avoid formation of a gel due to the water sensitivity of the product.

Control of the repeating unit, Formula I, of the polysiloxane can be effected by introducing an end blocker, as for example, a monomeric or polymeric ester into the reaction mixture, at the beginning of the reaction or at any convenient point in the reaction process.

The number of repeating units of the polysiloxane is equal to the mole ratio of the monomeric silane to the end blocker as exemplified by the following simplified reaction scheme wherein the silane is shown to be acetooxyethyltrimethoxy silane and the high boiling ester is shown to be methyl benzoate:

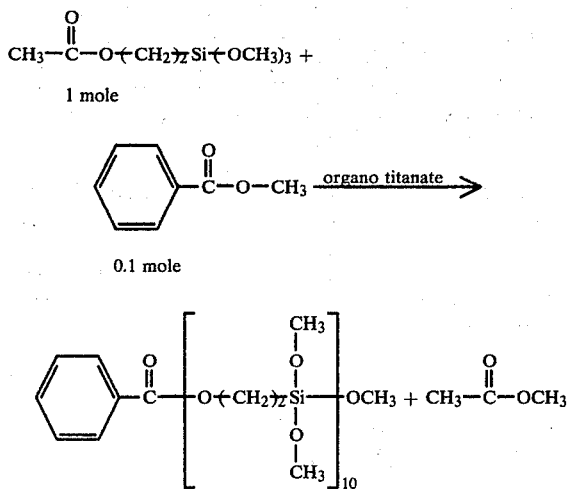

Suitable end blockers have the general formula:

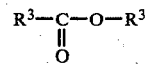

wherein each $R^3$, which can be the same or different, is a hydrocarbon radical as defined for $R^2$.

Completion of the reaction is evidenced by cessation of the evolution of volatiles and the weight/volume of volatiles collected as compared to the theoretical weight/volume. Alternatively, the reaction can be run to a desired viscosity level and the reactants cooled to stop the reaction.

The polysiloxanes have a viscosity of about 0.5 poise to about 150 poise, preferably about one to about 20 poise as determined by a Gardner-Holt bubble viscometer at a temperature of 25° C.

Preferred polysiloxanes, for purposes of this invention, contain repeating units falling within the scope of Formula I, have the viscosity indicated above and are produced using an organo titanate catalyst. It is believed that the titanium combines with the polysiloxane to produce organo titanate modified polysiloxanes.

The polysiloxanes can be admixed with the desired matrix, when the matrix is solid, and adequately dispersed therein by admixing in a Brabender mixer at a temperature between the melting point of the matrix and about 250° C., preferably at a temperature of about 110° C. to about 170° C. The mixing is preferably conducted under constant torque until a homogenized product is obtained. In those instances wherein the matrix is liquid, the liquid and polysiloxane are admixed in a Henschel mixer at temperatures of about 110° C. to about 170° C.

It is preferred to produce the polysiloxane in situ by admixing a monomeric silane and catalyst with the matrix and condensing the silane to a polysiloxane under the conditions previously described. With respect to this method of preparation, the amount of polysiloxane dispersed in the matrix, on a calculated basis, is equal to the weight of starting material (monomeric silane plus end blocker) minus the weight of the volatiles collected.

The alkylene-alkyl acrylate copolymers with which the polysiloxanes (in the form of a masterbatch composition) are reacted to form the silane modified copolymers are known copolymers produced by reacting an alkene with an alkyl acrylate.

Suitable alkenes are ethylene, propylene, butene-1, isobutylene, pentene-1, 2-methylbutene-1, 3-methylbutene-1, hexene, heptene-1, octene-1, and the like as well as mixtures thereof.

The alkylene moiety of the alkylene-alkyl acrylate copolymers generally contains from 2 to 18 carbon atoms inclusive, preferably 2 to 3 carbon atoms inclusive.

Suitable alkyl acrylate monomers which are copolymerized with the alkenes fall within the scope of the following formula:

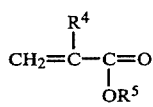

Formula IV wherein $R^4$ is hydrogen or methyl and $R^5$ is alkyl having one to 8 carbon atoms inclusive. Illustrative compounds encompassed by this formula are: methyl acrylate, ethyl acrylate, t-butyl acrylate, methyl methacrylate, n-butyl methacrylate, 2-ethylhexyl acrylate and the like as well as mixtures thereof.

Alkylene-alkyl acrylate copolymers generally have a density (ASTMD 1505 with conditioning as in ASTMD 147-72) of about 0.92 to about 0.94 and a melt index (ASTMD 1238 of 44 psi tested pressure) of about 0.5 to about 500 decigrams per minute and contain about 5 to about 50 percent by weight combined alkyl acrylate.

For purposes of the present invention, the preferred copolymer is a copolymer of ethylene-ethyl acrylate, generally having about five to about 50 percent by weight combined ethyl acrylate, preferably having about 5 to about 30 percent by weight combined ethyl acrylate.

The production of a silane modified copolymer of an alkylene-alkyl acrylate is carried out by reacting a polysiloxane, as described, with a copolymer of an alkylene-alkyl acrylate in the presence of an organo titanate catalyst.

In those instances wherein the polysiloxane contains combined organo titanate, additional organo titanate catalyst may not be necessary, especially when at least about 0.5 percent by weight organo titanate, based on the weight of the monomeric silane, was used in the preparation of the polysiloxane.

The amount of organo titanate catalyst added to the reaction mixture is a catalytic amount, sufficient to catalyze the reaction between the polysiloxane and the copolymer. A preferred amount is from about 0.001 to about 50 percent by weight, most preferably about 0.1 to about 25 percent by weight based on the weight of the polysiloxane.

The amount of polysiloxane used can vary from about 0.05 to about 10 and preferably about 0.3 to about 5 percent by weight based on the weight of the copolymer.

The temperature at which this reaction is carried out is not critical and can vary, conveniently, from about 80° C. to about 300° C. and preferably from about 150° C. to about 230° C.

The reaction can be carried out at atmospheric, subatmospheric or superatmospheric pressure, although atmospheric pressure is preferred. Also, the reaction can be conducted in the presence of solvents, previously described.

Completion of the reaction is evidenced by measurement of no further viscosity change.

Recovery of the silane modified copolymer is effected by allowing the contents of the flask to cool and discharging to a suitable receiver for storage, preferably under an inert gas blanket.

The reaction can be carried out in any suitable apparatus, preferably an apparatus in which the copolymer is subjected to mechanical working such as a Brabender mixer, a Banbury mixer or an extruder. The polysiloxane (masterbatch) can be added to the fluxed copolymer and the organo titanate, if needed, then added. Alternatively, the organo titanate, if needed, can be added to the copolymer prior to the addition of the polysiloxane (masterbatch). Also, the organo titanate and the polysiloxane (masterbatch) can be premixed and added to the fluxed polymer.

The reaction between the alkylene-alkyl acrylate copolymer and the polysiloxane may be depicted by the following equation:

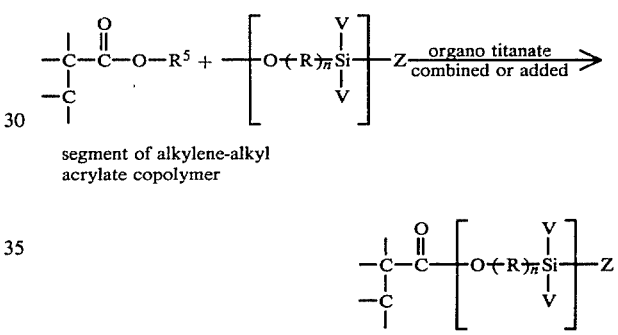

wherein the variables are as previously defined and the silicon containing unit is present in an amount of at least about 0.05 percent by weight, generally about 0.1 to about 10 percent by weight and preferably about 0.3 to about 5 percent by weight based on the total weight of the modified copolymer.

The curing or crosslinking of the silane modified alkylene-alkyl acrylate copolymer is effected by exposing the copolymer to moisture. The moisture present in the atmosphere is usually sufficient to permit curing to occur over a period of 48 hours.

The rate of curing, in a matter of 30 minutes, can be accelerated by exposure to an artificially humidified atmosphere or by immersion in water, and heating to elevated temperatures or by exposure to steam.

Generally, curing is effected at temperatures on the order of about 23° C. to about 100° C., preferably about 70° C. to about 100° C.

Additionally, the crosslinking may be carried out in the presence of a silanol condensation catalyst. A unique feature of this invention is that the crosslinking reaction can be carried out at significant rates in the absence of an added silanol condensation catalyst. The organo titanate catalyst or catalyst residues remaining from the production of the silane modified copolymers also catalyze the crosslinking reaction.

Alternatively, a wide variety of materials which function as silanol condensation catalysts and which are known in the art can be employed in the crosslinking process. Such materials include metal carboxylates previously described, organic bases such as ethylamine, hexylamine, dibutylamine, piperidine and the like and acids such as mineral acids, fatty acids and the like.

To the silane modified copolymers of this invention can be added various additives, in amounts well known in the art such as fillers among which can be mentioned carbon black, clay, talc, talc coated with a metal salt of a fatty acid having 8 to 20 carbon atoms, calcium silicate, calcium carbonate, silica, aluminum hydroxide and the like. Other additives include silanes such as vinyltris-(2-methoxy)silane and other like hydrophobic materials.

The silane modified copolymers can be rendered flame retardant by the addition thereto of halogen containing flame retardants such as decabromodiphenyl oxide, ethylene(bis-tetrabromophthalimide), chlorinated polyethylene, polyvinyl chloride and halogenated paraffin waxes, alone or in admixture with inorganic compounds such as antimony oxide and/or alkaline earth metal oxides, carbonates, hydroxides and sulfates. Among such alkaline earth metal compounds can be noted calcium oxide, calcium carbonate, calcium hydroxide, calcium sulfate, magnesium oxide, magnesium carbonate, magnesium hydroxide and magnesium sulfate. Other additives such as smoke suppressants illustrated by zinc borate, molybdenum oxide and the like can also be used.

The following examples further illustrate the present invention and are not intended to limit the scope thereof in any manner.

EXAMPLE 1

Part A of this example illustrates the preparation in an ethylene polymer matrix, of a polysiloxane wherein the ethylene polymer serves as a reactive matrix and as an end blocker for the polysiloxane.

The production of the polysiloxane can be depicted by the following idealized reaction scheme wherein the organo silane monomer was acetooxyethyltrimethoxysilane.

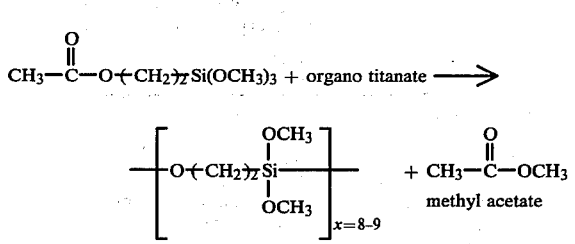

Forty grams of an ethylene-ethyl acrylate copolymer, having a melt index of 2 and containing 2.5 percent by weight combined ethyl acrylate, were charged into a Brabender mixer, which had been preheated to a temperature of 120° C., and fluxed therein for 2 minutes. At the end of the 2 minute period, 20.8 grams of acetooxyethyltrimethoxysilane and 0.43 CC of tetraisopropyl titanate were added into the Brabender. The contents of the Brabender were mixed and allowed to react for one hour, under an argon gas flow, while the temperature was maintained below 135° C. During the one hour period, methylacetate, the volatile generated (boiling point of 57° C.) was allowed to escape under the flow of the argon gas. Completion of the reaction was evidenced by cessation of evolution of volatiles.

Calculations:
Total volatiles recovered—7.3 grams
13.5 grams of polysiloxane reacted in 40 grams of ethylene-ethyl acrylate copolymer.

The masterbatch composition was discharged, pressed into sheets, 0.1 inch thick, cut into small pieces and stored under argon gas in a polyethylene bag. Visual inspection of sheets indicated uniform distribution of polysiloxane in resin matrix. Sheets were of a uniform opaque appearance and not "marbled".

Part B

A 40 gram Brabender mixer was preheated to a temperature of 160° C. and charged with 38 grams of an ethylene-ethyl acrylate copolymer, having a melt index of 1.6 and containing 15 percent by weight combined ethyl acrylate, 5.35 grams of the masterbatch of Part A and 0.5 CC of a 4 to 1 mixture, by volume, of tetraisopropyl titanate and dibutyltin dilaurate. The contents of the Brabender were mixed for thirty minutes at a temperature of 160° C. to 165° C. with the result that a water-curable, silane modified ethylene-ethyl acrylate copolymer was produced.

Samples were used to prepare test plaques, having dimensions of 3 inches by 8 inches by 0.125 inch in a press, under the following conditions:
Pressure 5000 psi
Temperature 130° C.
Time Cycle 5 minutes Plaques were immersed in water, which was at a temperature of 90° C., for two hours in order to insure curing to crosslinked products. The plaques were then removed from the water, wiped dry and placed in a vacuum oven, which was at a temperature of 50° C., for one hour to remove residual water.

Plaques were then subjected to the following tests:

| | |
|---|---|
| Monsanto Rheometer Cure (Inch/Lbs) (Described in Detail in U.S. Pat. No. 4,018,852, granted April 19,1977) | 40.3 |
| Decaline Extractables (%) ASTMD-2765 | 25.9* |
| Deformation (%) ASTMD-621 | 33.6* |
| Tensile Strength (psi) ASTMD-412 | 1320** |
| Elongation (%) ASTMD-412 | 180** |

*average of two values
**average of three values

Tests noted subsequently were carried out using the same test procedures. Test results reported were based on average values as indicated in Example 1.

EXAMPLE 2

In order to demonstrate the moisture resistivity of the masterbatch compositions of this invention, a sample of the masterbatch composition of Example 1, Part A, was placed in an open aluminum dish and allowed to stand under ambient conditions. After 20 hours, the sample was used to repeat Example 1, Part B.

Plaques were then prepared, cured as described in Example 1 and subjected to the tests described below:

| | |
|---|---|
| Masterbatch Aged (Hours) | 20 |
| Monsanto Rheometer | 38.0 |

| (Inch/Lbs) | |
|---|---|
| Deformation (%) | 25 |
| Tensile Strength (psi) | 1370 |
| Elongation (%) | 210 |

The data of Examples 1 and 2 show that the activity of the masterbatch is not adversely affected on being exposed to the moisture of the atmosphere.

A 5.35 gram sample of acetooxyethyltrimethoxy silane was also placed in an open aluminum dish and allowed to stand under ambient conditions for 20 hours. The silane, originally a liquid, gelled to a crosslinked product having no further reactive activity.

EXAMPLE 3

Part A

A three liter flask was charged with 2140 grams (10.29 moles) of acetooxyethyltrimethoxy silane, 154 grams (1.03 moles of ethyl benzoate (end blocker) and the contents of the flask brought to a temperature of 85° C. To this mixture, there was then added 21 grams of tetraisopropyl titanate. The solution, kept under an argon gas atmosphere, was stirred while being heated for 5¾ hours at a temperature of 94° C.–125° C. During this period of time, 752 grams of volatiles were collected in an acetone dry ice trap. This was 98.8 percent of the theoretical amount of methyl acetate based on 100 percent conversion. The polysiloxane product recovered, 1543 grams, was 99.3 percent of the theoretical yield. Viscosity of the product was 1.4 poise. An equation for the preparation of the polysiloxane may be written as follows:

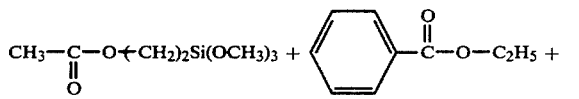

organo titanate ⟶

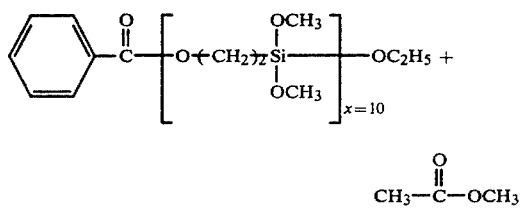

Part B

A 40 gram Brabender mixer was preheated to a temperature of 160° C. and charged with 30 grams of polyethylene having a melt index of 1.90, 10 grams of the polysiloxane of Example 3A and 0.2 CC of tetraisopropyl titanate. The contents of the Brabender were mixed until a constant torque was maintained on a Plasticord recorder. The masterbatch was discharged from the Brabender, pressed into sheets, cut into small pieces and stored under argon gas in a polyethylene bag.

Part C

Example 3B was repeated using in place of the polyethylene, an ethylene-ethyl acrylate copolymer having a melt index of 2 and containing 2.5 percent by weight combined ethyl acrylate.

The masterbatch compositions of Part B and Part C were used, in lieu of the masterbatch composition of Example 1, to produce silane modified copolymers using the materials and procedures of Example 1B with the exception that 0.2 gram of polymerized 1,2-dihydro-2,3,4-trimethylquinoline, was added to the Brabender.

Plaques were prepared from each composition and cured as described in Example 1B. Tests conducted and the results thereof are set forth below.

| | SILANE MODIFIED COPOLYMERS USING: | |
|---|---|---|
| | MASTERBATCH B | MASTERBATCH C |
| Monsanto Rheometer (Inch/Lbs) | 44 | 38.5 |
| Deformation (%) | 24.3 | 24.2 |
| Decaline Extractables (%) | 22.6 | 21.5 |
| Tensile Strength (psi) | 1250 | 1310 |
| Elongation (%) | 183 | 150 |

EXAMPLE 4

This example illustrates the moisture resistivity of the masterbatch compositions of this invention.

Samples of masterbatch compositions of Example 3B and 3C were placed in open aluminum dishes and allowed to stand under ambient conditions. After the time indicated, 5.35 grams of each sample were used in lieu of the masterbatch composition of Example 1 to repeat Example 1, part B.

Plaques were then prepared, cured as described in Example 1 and subjected to the tests described below.

| | SILANE MODIFIED ETHYLENE-ETHYL ACRYLATE COPOLYMERS PREPARED USING MASTERBATCH OF: | | | |
|---|---|---|---|---|
| | EXAMPLE 3B | | EXAMPLE 3C | |
| | Aged 20 Hrs. | Aged 100 Hrs. | Aged 20 Hrs. | Aged 100 Hrs. |
| Monsanto Rheometer (Inch/Lbs) | 43 | 43 | 40 | 35 |
| Deformation (%) | 30.2 | 27.3 | 29.0 | 33 |
| Decalin Extractables (%) | 30.6 | 22.6 | 22.1 | 23.4 |
| Tensile Strength (psi) | 1200 | 1260 | 1260 | 1300 |
| Elongation (%) | 177 | 183 | 140 | 200 |
| Retained Rheometer (%) From Original (Example 3) | 98 | 98 | 106 | 91 |

EXAMPLE 5

This example illustrates that the masterbatch compositions of this invention can be used in highly filled systems to produce water-curable, silane modified alkylene-alkyl acrylate copolymers.

A highly filled composition was prepared, having the formulation shown below, in a Brabender mixer which had been preheated to a temperature of 120° C. After a mixing period of five minutes, the contents of the Brabender were discharged, hot, flattened in a press and allowed to cool.

| FORMULATION I | |
|---|---|
| Copolymer of Ethylene-Ethyl Acrylate Containing 15% by Weight Combined Ethyl Acrylate-Melt Index 1.6 | 56 |
| Talc Coated with Zinc Stearate | 21.9 |
| Antimony Oxide | 2.55 |
| Calcium Carbonate | 2.55 |
| Ethylene (Bis-tetrabromophthalimide) (Flame Retardant Additive) | 16.3 |
| Polymerized 1,2-dihydro-2,3,4-trimethyl Quinoline (Antioxidant) | 0.5 |
| Vinyl-tris(2-methoxy) Silane | 0.2 |

Samples of fifty-three grams of this composition, referred to as Formulation I, were used in the preparation of silane modified alkylene-alkyl acrylate copolymers in a manner described in Example 1B, using the following overall reactants:

| | A | B |
|---|---|---|
| Formulation I | 53 grams | 53 grams |
| Masterbatch Composition Example 3C | 3.75 grams | — |
| Masterbatch Composition Example 3B | — | 3.75 grams |
| Catalyst - Premixed Solution of 4 Parts by Volume Tetraisopropyl Titanate and One Part by Volume Dibutyltin Dilaurate | 0.35 CC | 0.35 CC |

Plaques were then prepared, cured as described in Example 1 and subjected to the tests described below.

| | A | B |
|---|---|---|
| Monsanto Rheometer (Inch/Lbs) | 40 | 31 |
| Decaline Extractables (%) | 21.2 | 22.9 |
| Deformation (%) | 31.2 | 30.2 |
| Tensile Strength (psi) | 1590 | 1720 |
| Elongation (%) | 103 | 140 |

EXAMPLE 6

This example illustrates the successful use of masterbatch compositions containing varying amounts of polysiloxanes, to produce silane modified alkylene-alkyl acrylate copolymers. Reaction mixtures had the following formulations:

| | A | B | C |
|---|---|---|---|
| Ethylene-Ethyl Acrylate Copolymer - Melt Index of 1.6 Containing 15% by Weight Combined Ethyl Acrylate Formulation I Described in Example 5 | 38 grams | 38 grams | 53 grams |
| Polyermized 1,2-Dihydro-3,4-trimethyl Quinoline | 0.2 gram | 0.2 gram | — |
| Masterbatch I Polyethylene Matrix Containing 40% by Weight Polysiloxane of Example 3, Based on Weight of Polyethylene | 2.68 grams | — | 3.1 grams |
| Masterbatch II Polyethylene Matrix Containing 14.3% by Weight Polysiloxane of Example 3, Based on Weight of Polyethylene | — | 10.7 grams | — |
| Catalyst-Tetraisopropyl Titanate-Dibutyltin Dilaurate Mixture Described in Example 5 | 0.5 CC | 0.5 CC | 0.3 CC |

Masterbatch I and II were prepared as described in Example 3B. Mixtures were reacted in a manner described in Example 1, the resultant reaction products formed into plaques as described in Example 1 and subjected to the Monsanto Rheometer test, as initially prepared and after aging at ambient conditions for the periods of time indicated.

| | SILANE MODIFIED ETHYLENE-ETHYL ACRYLATE COPOLYMERS FROM COMPOSITIONS OF: | | |
|---|---|---|---|
| | A | B | C |
| Monsanto Rheometer (Inch/Lbs) Initial | 47 | 44 | 50 |
| Aged 20 Hours | 42.5 | — | 62 |
| Aged 7 Days | 30.5 | 35.0 | 40 |

Masterbatch compositions, the formulations of which are set forth in Table 1, were admixed in a Brabender mixer at a temperature of 125° C., under an argon gas atmosphere.

TABLE 1

| | EXAMPLE 7 | EXAMPLE 8 | EXAMPLE 9 |
|---|---|---|---|
| Polyethylene Having a Melt Index of 1.9 | 30 grams | — | — |
| Low Pressure Polyethylene Having a Melt Index of 0.8 and a Density of 0.920 | — | 32 grams | — |
| Terpolymer of Ethylene-Propylene-Diene Monomer Nordel 2722 (Marketed by E. I. Dupont Co.) | — | — | 32 grams |
| Polymerized 1,2-Dihydro-2,3,4-Trimethyl Quinoline | 0.1 gram | 0.1 gram | 0.1 gram |
| Polysiloxane (Described in Example 3) | 10 grams | 8 grams | 8 grams |
| Time to Homogenize (Minutes) | 48 | 21 | 42 |

Masterbatch compositions of Examples 7-9 were used to prepare reaction mixtures, the formulations of which are set forth in Table II below. The reaction mixtures were reacted to form silane modified ethylene-ethyl acrylate copolymers, from which plaques were formed, water-cured and tested as described in Example 1.

TABLE II

| | SILANE MODIFIED ETHYLENE-ETHYL ACRYLATE COPOLYMERS FROM COMPOSITIONS OF: | | |
|---|---|---|---|
| | Example 7 | Example 8 | Example 9 |
| Ethylene-Ethyl Acrylate Copolymer Containing 15% by Weight Ethyl Acrylate Melt Index-1.6 | 32 grams | 32 grams | 32 grams |
| Masterbatch of Example 7 | 5.35 grams | — | — |
| Masterbatch of | — | 6.7 grams | — |

TABLE II-continued

| | SILANE MODIFIED ETHYLENE-ETHYL ACRYLATE COPOLYMERS FROM COMPOSITIONS OF: | | |
|---|---|---|---|
| | Example 7 | Example 8 | Example 9 |
| Example 8 Masterbatch of Example 9 | — | — | 6.7 grams |
| Catalyst-Tetra-isopropyl Titanate-Dibutyltin Dilaurate Described in Example 5 | 0.3 CC | 0.3 CC | 0.3 CC |
| Polymerized 1,2-Dihydro-2,3,4-Trimethyl Quinoline | 0.2 gram | 0.2 gram | 0.2 gram |
| Monsanto Rheometer (Inch/Lb) | 32.5 | 17 | 20 |
| Tensile Strength (psi) | 1250 | 1750 | 1120 |
| Elongation (%) | 293 | 513 | 407 |
| Decaline Extractables (%) | 27.8 | 42.3 | 38.1 |

It is to be noted that in producing the polysiloxanes, in situ or separately, mixtures of silanes can be used.

Similar results are achieved using as the monomeric silanes, in the in situ preparation of polysiloxanes, the following:
γ-methacryloxypropyl-tris(2-methoxyethoxy)silane
acryloxypropyltrimethoxysilane

What is claimed is:

1. A process of producing a water-curable, silane modified alkylene-alkyl acrylate copolymer which comprises admixing an alkylene-alkyl acrylate copolymer, an organo titanate and polysiloxane having the formula:

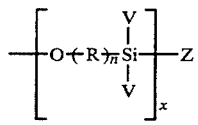

wherein R is a hydrocarbon radical, each V is hydrogen, a hydrocarbon radical or a hydrolyzable group and Z is a hydrolyzable group, n is an integer having a value of 1 to 18 inclusive and x is an integer having a value of at least 2, said polysiloxane predispersed in a thermoplastic resin matrix which is compatible with the said polysiloxane and said alkylene-alkyl acrylate copolymer and does not adversely interfere with the reaction between said polysiloxane and said alkylene-alkyl acrylate copolymer, with the result that said polysiloxane reacts with said alkylene-alkyl acrylate copolymer to produce a water-curable, silane modified copolymer.

2. A process as defined in claim 1 conducted at a temperature of about 80° C. to about 300° C.

3. A process as defined in claim 1 conducted at a temperature of about 150° C. to about 230° C.

4. A process as defined in claim 1 wherein the organo titanate has the formula:

$$Ti(OR^2)_4$$

wherein each $R^2$ is hydrogen or a hydrocarbon radical.

5. A process as defined in claim 4 wherein each $R^2$ is an alkyl radical having 1 to 18 carbon atoms inclusive.

6. A process as defined in claim 1 wherein the said copolymer is a copolymer of ethylene-ethyl acrylate.

7. A process as defined in claim 1 wherein R in the repeating unit of the silane is an alkylene radical having 1 to 18 carbon atoms inclusive.

8. A process as defined in claim 1 wherein R in the repeating unit of the silane is $-CH_2-CH_2$.

9. A process as defined in claim 1 wherein R in the repeating unit of the silane is $-CH_2-CH_2-CH_2-$.

10. A process as defined in claim 1 wherein each V in the repeating unit of the silane is methoxy.

11. A process as defined in claim 1 wherein the organo titanate is tetraisopropyl titanate or tetrabutyl titanate.

12. A process as defined in claim 1 wherein the organo titanate is present in an amount of about 0.001 to about 25 percent by weight based on the weight of the polysiloxane.

13. A process as defined in claim 1 wherein the polysiloxane is present in an amount of about 0.5 to about 10 percent by weight based on the weight of the copolymer.

14. A process as defined in claim 1 wherein the polysiloxane contains combined organo titanate.

15. A process as defined in claim 1 wherein is an added ingredient a metal carboxylate silanol condensation catalyst.

16. A process as defined in claim 15 wherein the metal carboxylate is dibutyltin dilaurate.

17. A process as defined in claim 1 wherein the polysiloxane is derived from acetooxyethyltrimethoxysilane.

18. A process as defined in claim 1 wherein the polysiloxane is derived from acetooxypropyltrimethoxysilane.

19. A process as defined in claim 1 wherein the polysiloxane is derived from γ-methacryloxypropyl-tris-(2-methoxyethoxy)silane.

* * * * *

UNITED STATES PATENT AND TRADEMARK OFFICE
CERTIFICATE OF CORRECTION

PATENT NO. : 4,440,907
DATED : April 3, 1984
INVENTOR(S) : Michael J. Keogh

It is certified that error appears in the above—identified patent and that said Letters Patent is hereby corrected as shown below:

Column 1, line 9, "our" should read -- my --
Column 1, line 65, "polysiloxanealkylene" should read -- polysiloxane-alkylene --
Column 2, line 43, "nitrilebutadiene" should read -- nitrile-butadiene --
Column 3, line 41, "No. 3,139,567" should read -- No. 3,193,567 --
Column 3, line 52, "as alkyl" should read -- an alkyl --
Column 13, line 57, "Polyermized" should read -- Polymerized --
Claim 7, line 2, "silane" should read -- polysiloxane --
Claim 8, line 2, "silane" should read -- polysiloxane --
Claim 9, line 2, "silane" should read -- polysiloxane --
Claim 10, line 2, "silane" should read -- polysiloxane --
Claim 15, lines 1-2, delete "is an added ingredient"
Claim 15, last line, after "catalyst" insert -- is an added ingredient --

Signed and Sealed this

Eighteenth Day of September 1984

[SEAL]

Attest:

Attesting Officer

GERALD J. MOSSINGHOFF
Commissioner of Patents and Trademarks

UNITED STATES PATENT AND TRADEMARK OFFICE
CERTIFICATE OF CORRECTION

PATENT NO. : 4,440,907
DATED : April 3, 1984
INVENTOR(S) : Michael J. Keogh

It is certified that error appears in the above-identified patent and that said Letters Patent is hereby corrected as shown below:

Claim 12, line 3; "25" should read -- 50 --

Claim 13, line 2; "0.5" should read -- 0.05 --

Signed and Sealed this

Eleventh Day of March 1986

[SEAL]

Attest:

DONALD J. QUIGG

Attesting Officer

Commissioner of Patents and Trademarks